United States Patent [19]

Soneda et al.

[11] Patent Number: 4,533,954
[45] Date of Patent: Aug. 6, 1985

[54] SOLID STATE IMAGE PICKUP APPARATUS

[75] Inventors: Mitsuo Soneda, Zama; Toshikazu Maekawa, Atsugi, both of Japan

[73] Assignee: Sony Corporation, Tokyo, Japan

[21] Appl. No.: 551,990

[22] PCT Filed: Feb. 5, 1983

[86] PCT No.: PCT/JP83/00031
§ 371 Date: Oct. 4, 1983
§ 102(e) Date: Oct. 4, 1983

[87] PCT Pub. No.: WO83/02868
PCT Pub. Date: Aug. 18, 1983

[30] Foreign Application Priority Data

Feb. 5, 1982 [JP] Japan .................. 57-17245

[51] Int. Cl.$^3$ .............................. H04N 5/79
[52] U.S. Cl. .................. 358/212; 358/209; 358/213; 250/578
[58] Field of Search .......... 358/209, 212, 213, 225, 358/227, 228, 56, 167; 250/578

[56] References Cited

U.S. PATENT DOCUMENTS

| | | | |
|---|---|---|---|
| 3,934,161 | 1/1976 | Caywood | 307/311 |
| 4,032,976 | 6/1977 | Levine | 358/213 |
| 4,057,830 | 11/1977 | Adcock | 358/127 |
| 4,131,919 | 12/1978 | Lloyd et al. | 360/9 |
| 4,189,749 | 2/1980 | Hiroshima et al. | 358/167 |
| 4,233,632 | 11/1980 | Akiyama | 358/212 |
| 4,380,755 | 4/1983 | Endlicher et al. | 382/68 |
| 4,399,464 | 8/1983 | Hix et al. | 358/213 |
| 4,420,773 | 12/1983 | Toyoda et al. | 358/335 |
| 4,472,744 | 9/1984 | Inoue et al. | 358/293 |

Primary Examiner—Gene Z. Rubinson
Assistant Examiner—Robert Lev
Attorney, Agent, or Firm—Hill, Van Santen, Steadman & Simpson

[57] ABSTRACT

In a solid state image pickup apparatus comprising a solid state image pickup device (1) which has an image pickup surface composed of a plurality of image pickup picture units ($E_{11}$–$E_{mn}$), each of which contains a first switching element ($S_{11}$, $S_{12}$, ... $S_{mn}$) and a photoelectric converter ($D_{11}$, $D_{12}$, ... $D_{mn}$) electrically connected to the first switching element, and which are disposed in a predetermined arrangement and second switching elements ($T_1$–$T_n$) connected to the image pickup picture units ($E_{11}$–$E_{mn}$) and vertical and horizontal scanning circuits (13:14) for driving the first and second switching elements ($S_{11}$–$S_{mn}$:$T_1$–$T_n$), the vertical and horizontal scanning circuits (13:14) are made operative in a stable state to cause the first and second switching elements ($S_{11}$–$S_{mn}$:$T_1$–$T_n$) to be continuously closed before a charge storage period in which signal charge is stored in the image pickup picture units ($E_{11}$–$E_{mn}$) and also made operative in a pulse generating state to cause the first and second switching elements ($S_{11}$–$S_{mn}$:$T_1$–$T_n$) to be selectively closed in a predetermined period after the charge storage period.

1 Claim, 10 Drawing Figures

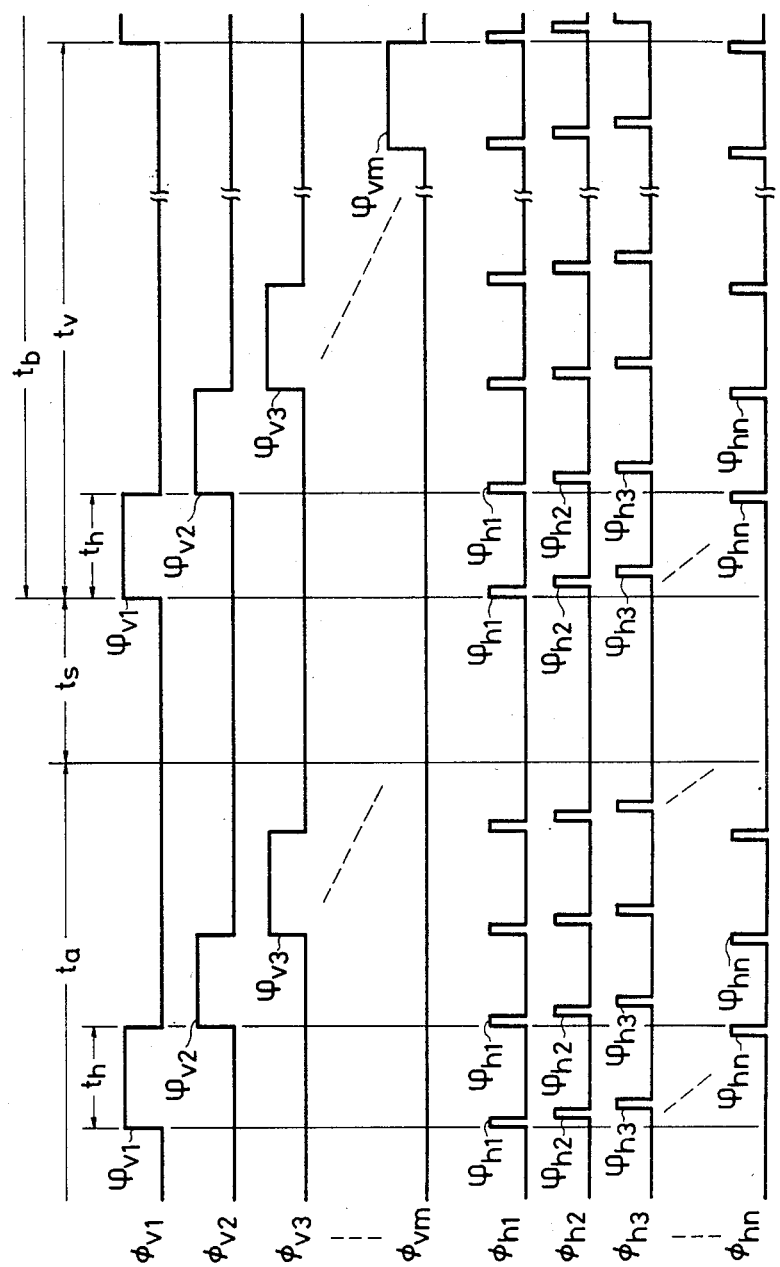

SOLID STATE IMAGE PICKUP APPARATUS

TECHNICAL FIELD

This invention relates generally to solid state image pickup apparatus which comprises a solid state image pickup device having a plurality of image pickup picture units arranged horizontally and vertically therein and a scanning circuit for driving switches provided for deriving a signal obtained in response to signal charge produced in the image pickup picture units, and more particularly, to an improved solid state image pickup apparatus employing such a solid state image pickup device and a scanning circuit as mentioned above, in which the switch driving manner taken by the scanning circuit is contrived so that electric power consumption is reduced and an image pickup signal output accompanied with suppressed noise is obtained when a signal representing a still image is derived from the solid state image pickup device.

TECHNICAL BACKGROUND

There has been proposed a solid state image pickup apparatus which comprises a solid state image pickup device having an image pickup surface composed of a plurality of image pickup picture units, each of which contains a photoelectric converter and a switching element, and which are arranged in a predetermined pattern, for example, horizontal and vertical rows, and a scanning circuit for causing the switching elements provided in the solid state image pickup device to be conductive selectively and deriving an image pickup signal output obtained in response to signal charge produced by the photoelectric converters through the switching elements made conductive. In the solid state image pickup device employed in such a solid state image pickup apparatus, the switching element is formed by, for example, an insulated gate field effect transistor of the MOS type (hereinafter referred to as a MOS FET) and the photoelectric converter is formed by a photodetecting diode provided in respect of each of the switching elements or a portion of a photoelectric conversion layer provided to overspread the arrangement of the switching elements.

In the case of the situation wherein an image pickup signal output representing a still image is derived from such a solid state image pickup apparatus as mentioned above, that is, the solid state image pickup apparatus is formed into a so-called still television camera, a mechanical or electric shutter is provided to the solid state image pickup device. The mechanical or electric shutter is operative to be shut when the image pickup operation is not performed and to be open during a short period in the image pickup operation. When the shutter is shut, a light coming from the outside is prevented from entering into the image pickup surface of the solid state image pickup device or charge obtained by the photoelectric converters contained in the image pickup picture units in response to a light entering into the image pickup surface is prohibited from becoming signal charge, so that no signal charge is stored in the image pickup picture units. On the other hand, when the shutter is open, the light coming from the outside is permitted to enter into the image pickup surface or the charge obtained by the photoelectric converters contained in the image pickup picture units in response to the light entering into the image pickup surface is allowed to become the signal charge, so that the signal charge is stored in the image pickup picture units and therefore an image pickup signal output representing a still image picked up on that occasion is obtained.

An equivalent circuit of the essential part of one example of such solid state image pickup apparatus as described above is shown in FIG. 1. In this equivalent circuit, a solid state image pickup device 1 is provided with MOS FETs $S_{11}$ to $S_{mn}$ acting as switching elements, respectively, and arranged in the horizontal direction (the direction shown by an arrow H) and the vertical direction (the direction shown by an arrow V) to form the horizontal and vertical rows, and photoelectric converters $D_{11}$ to $D_{mn}$ each having one end connected to one end, for example, a source of the corresponding one of the MOS FETs $S_{11}$ to $S_{mn}$. These MOS FETs $S_{11}$ to $S_{mn}$ and photoelectric converters $D_{11}$ to $D_{mn}$ form an image pickup surface of the solid state image pickup device 1, and each combination of one of the MOS FETs $S_{11}$ to $S_{mn}$ and one of the photoelectric converters $D_{11}$ to $D_{mn}$ connected thereto forms one of image pickup picture units $E_{11}$ to $E_{mn}$ contained in the image pickup surface. The concrete configuration of each image pickup picture unit is shown in FIGS. 2A, 2B, 3A and 3B.

FIG. 2A shows the cross section of a portion where one of the image pickup picture units $E_{11}$ to $E_{mn}$ is formed in an example of concrete configurations of the solid state image pickup device 1. In this example, N type semiconductor regions 3 and 4 are formed in a P type semiconductor substrate 2 and a gate electrode 6 is provided on the area between the N type semiconductor regions 3 and 4 through an insulating layer 5 so as to extend to both of the N type semiconductor regions 3 and 4, so that a MOS FET S, which is one of the MOS FETs $S_{11}$ and $S_{mn}$, is formed with a drain at the N type semiconductor region 3 and a source at the N type semiconductor region 4, for example. The MOS FET S has a drain electrode 7. Further, a photoelectric converter D, which is one of the photoelectric converters $D_{11}$ to $D_{mn}$, is formed by a P-N junction between the P type semiconductor substrate 2 and the N type semiconductor region 4 in the form of a photodetecting diode and thereby the photoelectric conversion is performed in response to the light entering into the N type semiconductor region 4.

During the image pickup operation, the P type semiconductor substrate 2 is grounded and accordingly an equivalent circuit of the example shown in FIG. 2A in which the photoelectric converter D is formed into the photodetecting diode is obtained as shown in FIG. 2B wherein a substrate of the MOS FET S is grounded and the earth potential is supplied to an anode of the photodetecting diode forming the photoelectric converter D.

FIG. 3A shows the cross section of a portion where one of the image pickup picture units $E_{11}$ to $E_{mn}$ is formed in another example of concrete configurations of the solid state image pickup device 1. In this example also, the N type semiconductor regions 3 and 4 are formed in a P type semiconductor substrate 2 and the gate electrode 6 is provided on the area between the N type semiconductor regions 3 and 4 through the insulating layer 5 so as to extent to both of the N type semiconductor regions 3 and 4, so that the MOS FET S, which is one of the MOS FETs $S_{11}$ to $S_{mn}$, is formed with a drain at the N type semiconductor region 3 and a source at the N type semiconductor region 4. The MOS FET S in this case has a source electrode 8 provided on the N type semiconductor region 4 in addition to the drain electrode 7 provided on the N type semiconductor region 3. Further, an insulating layer 9 is provided to cover the portion where the MOS FET S is formed except an area on the source electrode 8, and an electrode 10 formed by, for example, an aluminium layer is provided on both of the insulating layer 9 and the source electrode 8 and electrically connected with the source electrode 8. Besides, a photoelectric conversion layer 11 formed by, for example, an amorphous silicon layer is provided on the electrode 10 and a transparent electrode (target electrode) 12 is provided on the photoelectric conversion layer 11. A part of the photoelectric conversion layer 11 spreading over the portion where the MOS FET S is formed acts as the photoelectric converter D, which is one of the photoelectric converters $D_{11}$ to $D_{mn}$. That is, in this example, each of the photoelectric converters $D_{11}$ to $D_{mn}$ is not formed by an independent element such as a photodetecting diode but formed by a portion of the photoelectric conversion layer 11 covering the image pickup surface. A light coming from the outside enters into the image pickup surface through the target electrode 12.

During the image pickup operation, the P type semiconductor 2 is grounded and a target voltage $V_T$, which is a predetermined DC voltage, is supplied to the target electrode 12. Accordingly, an equivalent circuit of the example shown in FIG. 3A in which the photoelectric converter D is formed by the photoelectric conversion layer 11 is obtained as shown in FIG. 3B wherein the substrate of the MOS FET S is grounded and the target voltage $V_T$ is supplied to one end of the photoelectric converter D.

Now, referring again to the equivalent circuit shown in FIG. 1, the gates of some of the MOS FETs $S_{11}$ to $S_{mn}$ forming the image pickup units $E_{11}$ to $E_{mn}$, respectively, which are aligned to form each horizontal row are connected in common to corresponding one of m (m is a positive integer) output terminals $v_1$ to $v_m$ of a vertical scanning circuit 13. The drains of some of the MOS FETs $S_{11}$ to $S_{mn}$ which are aligned to form each vertical row are connected in common to a source of corresponding one of MOS FETs $T_1$ to $T_n$ acting as switching elements. Gates of the MOS FETs $T_1$ to $T_n$ are connected to n (n is a positive integer) output terminals $h_1$ to $h_n$ of a horizontal scanning circuit 14, respectively, and drains of the MOS FETs $T_1$ to $T_n$ are connected in common to a voltage source 16 which supplies an operating voltage $V_v$, through an output resistance 15. Further, an output terminal 17 is provided between the common connection of the drains of the MOS FETs $T_1$ to $T_n$ and the output resistance 15.

The vertical scanning circuit 13 which comprises, for example, a shift register produces vertical scanning signals at the output terminals $v_1$ to $v_m$ and supplies them to the gates of the MOS FETs $S_{11}$ to $S_{mn}$ so as to cause some of the MOS FETs $S_{11}$ to $S_{mn}$ forming each horizontal row to be conductive simultaneously at every horizontal row in turn. Similarly, the horizontal scanning circuit 14 which also comprises, for example, a shift register produces horizontal scanning signals each having a frequency enough higher than that of each of the vertical scanning signals at the output terminals $h_1$ to $h_n$ and supplies them to the gates of the MOS FETs $T_1$ to $T_n$ so as to cause the MOS FETs $T_1$ to $T_n$ to be conductive in turn.

The other ends of the photoelectric converters $D_{11}$ to $D_{mn}$ opposite to the aforementioned one ends connected to the sources of the MOS FETs $S_{11}$ to $S_{mn}$ are connected in common to a terminal 18 to which a predetermined potential is supplied. For example, in case of the device in which the photoelectric converters $D_{11}$ to $D_{mn}$ are formed into the photodetecting diodes, such as the example shown in FIG. 2A, the earth potential is supplied to the terminal 18, while in case of the device in which the photoelectric converters $D_{11}$ to $D_{mn}$ are formed by the photoelectric conversion layer, such as the example shown in FIG. 3A, the potential corresponding to the target voltage $V_T$ is supplied to the terminal 18.

In the solid state image pickup apparatus constituted as described above, when a light coming from the outside reaches the image pickup picture units $E_{11}$ to $E_{mn}$ contained in the image pickup surface of the solid state image pickup device 1, the photoelectric conversion is performed at the photoelectric converters $D_{11}$ to $D_{mn}$ and charge is produced thereby in response to the light entering into the image pickup picture units $E_{11}$ to $E_{mn}$. If the charge produced by the photoelectric converters $D_{11}$ to $D_{mn}$ is stored in the sources of the MOS FETs $S_{11}$ to $S_{mn}$, such stored charge becomes signal charge and a signal obtained in response to the signal charge is derived through the MOS FETs $S_{11}$ to $S_{mn}$ which are made conductive selectively by the vertical scanning signals supplied from the vertical scanning circuit 13 and further through the MOS FETs $T_1$ to $T_n$ which are made conductive selectively by the horizontal scanning signals supplied from the horizontal scanning circuit 14 to the output terminal 17 as an image pickup signal output.

In the case of previously proposed solid state image pickup apparatus of the type described above, the vertical scanning circuit 13 produces vertical scanning signals $\phi_{v1}$ to $\phi_{vm}$ as shown in FIG. 4A at the output terminals $\phi_{v1}$ to $\phi_{vm}$, respectively, and the horizontal scanning circuit 14 produces horizontal scanning signals $\phi_{h1}$ to $\phi_{hn}$ as shown in FIG. 4B at the output terminals $h_1$ to $h_n$, respectively. The vertical scanning signals $\phi_{v1}$ to $\phi_{vm}$ take a constant low level in a period $t_s$ in which a shutter is made open and have pulses $\phi_{v1}$ to $\phi_{vm}$ each taking a constant high level during a period $t_h$ corresponding to one horizontal period for a video signal, respectively, in a period $t_a$ coming before the period $t_s$ and a period $t_b$ coming after the period $t_s$. The pulses $\phi_{v1}$ to $\phi_{vm}$ appear successively in each one vertical period for the video signal. Similarly, the horizontal scanning signals $\phi_{h1}$ to $\phi_{hn}$ also take a constant low level in the period $t_s$ and have pulses $\phi_{h1}$ to $\phi_{hn}$ each taking a constant high level during a short period, respectively, in the periods $t_a$ and $t_b$. The pulses $\phi_{h1}$ to $\phi_{hn}$ appear successively in the period of each of the pulses $\phi_{v1}$ to $\phi_{vm}$ of the vertical scanning signals $\phi_{v1}$ to $\phi_{vm}$. Each of the MOS FETs $S_{11}$ to $S_{mn}$ is made conductive when one of the pulses $\phi_{v1}$ to $\phi_{vm}$ of the vertical scanning signals $\phi_{v1}$ to $\phi_{vm}$ is supplied to the gate thereof, and each of the MOS FETs $T_1$ to $T_n$ is made conductive when one of the pulses $\phi_{h1}$ to $\phi_{hn}$ of the horizontal scanning signals $\phi_{h1}$ to $\phi_{hn}$ is supplied to the gate thereof.

Accordingly, in the period $t_s$ in which the shutter is made open, since all the MOS FETs $S_{11}$ to $S_{mn}$ and the MOS FETs $T_1$ to $T_n$ are nonconductive, the charge produced by the photoelectric converters $D_{11}$ to $D_{mn}$ is stored in the sources of the MOS FETs $S_{11}$ to $S_{mn}$, in other words, the signal charge is stored in the image pickup picture units $E_{11}$ to $E_{mn}$. After the period $t_s$, first, the pulse $\phi_{v1}$ of the vertical scanning signal $\phi_{v1}$ from the vertical scanning circuit 13 is supplied to the gates of the MOS FETs $S_{11}$ to $S_{1n}$ forming the first horizontal row so that the MOS FETs $S_{11}$ to $S_{1n}$ are made conductive and consequently the signal obtained in response to the signal charge stored in the sources of the MOS FETs $S_{11}$ to $S_{1n}$ is transferred to the sources of the MOS FETs $T_1$ to $T_n$. During the period of the pulse $\phi_{v1}$, the pulses $\phi_{h1}$ to $\phi_{hn}$ of the horizontal scanning signals $\phi_{h1}$ to $\phi_{hn}$ from the horizontal scanning circuit 14 are supplied to the gates of the MOS FETs $T_1$ to $T_n$, respectively, in turn so that the MOS FETs $T_1$ to $T_n$ are made conductive in turn and consequently a current obtained in response to the signal having been transferred to the sources of the MOS FETs $T_1$ to $T_n$ flows through the output resistor 15. As a result of this, an image pickup signal brought forth by the image pickup picture units $E_{11}$ to $E_{1n}$ containing the MOS FETs $S_{11}$ to $S_{1n}$, respectively, is obtained at the output terminal 17. Then, the pulses $\phi_{v2}$ of the vertical scanning signal $\phi_{v2}$ is supplied to the gates of the MOS FETs $S_{21}$ to $S_{2n}$ forming the second horizontal row so that the MOS FETs $S_{21}$ to $S_{2n}$ are made conductive and the MOS FETs $T_1$ to $T_n$ are made conductive in turn by the pulses $\phi_{h1}$ to $\phi_{hn}$ of the horizontal scanning signals $\phi_{h1}$ to $\phi_{hn}$. Consequently, an image pickup signal brought forth by the image pickup picture units $E_{21}$ to $E_{2n}$ containing the MOS FET $S_{21}$ to $S_{2n}$, respectively, is obtained at the output terminal 17. After that, in the similar manner, image pickup signals brought forth respectively by groups of the image pickup picture units up to the group of the image pickup picture units $E_{m1}$ to $E_{mn}$ containing the MOS FETs $S_{m1}$ to $S_{mn}$, respectively, are obtained successively at the output terminal 17 in a period $t_v$ corresponding to one vertical period for the video signal, so that an image pickup signal output for one vertical period is produced. As described above, the signals obtained in response to the signal charge produced and stored in the image pickup picture units $E_{11}$ to $E_{mn}$ are derived through the MOS FETs $S_{11}$ to $S_{mn}$ and the MOS FETs $T_1$ to $T_n$ to the output terminal 17 and the image pickup signal output representing a still image is obtained.

However, in the previously proposed solid state image pickup apparatus disclosed above, the vertical and horizontal scanning circuits are kept in the working condition in which, for example, the shift registers therein are operative to produce the vertical and horizontal signals $\phi_{v1}$ to $\phi_{vn}$ and $\phi_{h1}$ to $\phi_{hn}$ having the pulses $\phi_{v1}$ to $\phi_{vn}$ and $\phi_{h1}$ to $\phi_{hn}$, respectively, not only in the period $t_v$ corresponding to one vertical period but also in the period $t_a$ coming before the period $t_s$ in which the shutter is open and a portion of the period $t_b$ coming after the period $t_v$, that is, in a standby period, and accordingly the MOS FETs $S_{11}$ to $E_{mn}$ and the MOS FETs $T_1$ and $T_n$ are driven repeatedly to be made conductive and nonconductive alternately in the stand by period, so that the following disadvantages are raised. That is, in the standby period, the electric power as much as consumed in the period $t_v$ in which the image pickup signal output is produced is wasted in the vertical and horizontal scanning circuits. Further, at an instant just before the shutter is turned to be open in the beginning of the period $t_v$, it is situated that unnecessary charge obtained in the form of idling current in the photoelectric converters $D_{11}$ to $D_{mn}$ is kept to be stored in the image pickup picture units without uniformity, and such unnecessary charge is mixed with the signal charge stored afterward in the image pickup picture units $E_{11}$ to $E_{mn}$ when the shutter is open and causes noise components in the signals derived in response to the stored signal charge.

Accordingly, it is an object of the present invention to provide a solid state image pickup apparatus in which the driving manner taken by a scanning circuit for switching elements each constituting an image pickup picture unit is contrived so that an image pickup signal output representing a still image accompanied with enough suppressed noise components can be obtained with reduced electric power consumption.

DISCLOSURE OF THE INVENTION

According to an aspect of the present invention, there is provided a solid state image pickup apparatus comprising a solid state image pickup device which has an image pickup surface composed of a plurality of image pickup picture units, each of which contains a switching element and a photoelectric converter electrically connected to the switching element, and which are arranged in a predetermined pattern, and a scanning circuit arrangement for driving the switching element provided in the solid state image pickup device, in which the scanning circuit arrangement is operative to cause the switching elements to be continuously closed before a charge storage period in which signal charge is stored in the image pickup picture units and to produce pulses to cause the switching elements to be selectively closed in a predetermined period after the charge storage period.

With the solid state image pickup apparatus thus constituted in accordance with the present invention, in the image pickup operation for obtaining an image pickup signal output representing a still image, since vertical and horizontal scanning circuits for controlling the solid state image pickup device operate in a stable state to cause the switching elements contained in the image pickup picture units to be continuously closed before the charge storage period and also operate in a pulse producing state to cause the switching elements to be selectively closed in the predetermined period after the charge storage period, the electric power consumed in the vertical and horizontal scanning circuits is reduced, and unnecessary charge is prevented from being stored in the image pickup picture units before the charge storage period, so that the image pickup signal output accompanied with enough suppressed noise components can be obtained.

BRIEF DESCRIPTION OF THE DRAWINGS

FIGS. 4A and 4B are waveform diagrams used for explaining the operation of a previously proposed solid state image pickup apparatus.

AN EMBODIMENT MOST PREFERABLE FOR WORKING OF THE INVENTION

Figure 1:
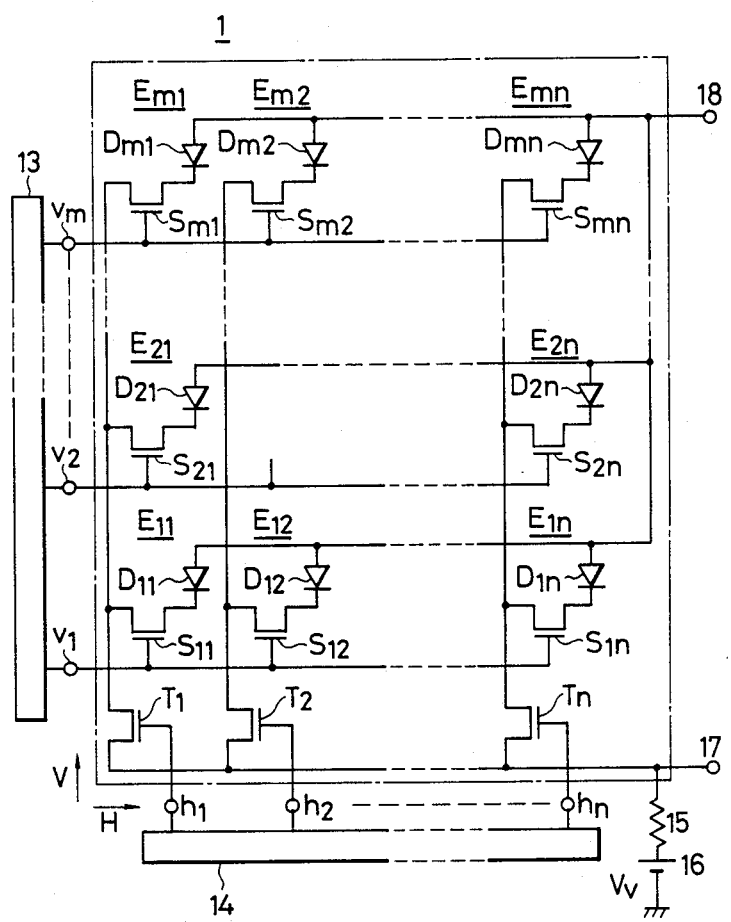
FIG. 1 is an equivalent circuit diagram showing an essential part of an example of solid state image pickup apparatus to which the present invention can be applied.
Figure 2A:
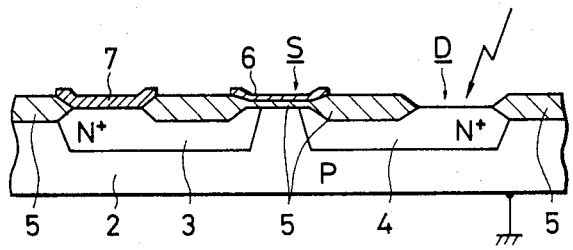
FIG. 2A is a sectional view showing one example of concrete configuration of a portion of the apparatus shown in FIG. 1.
Figure 2B:
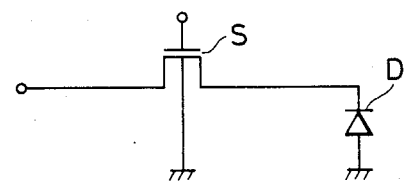
FIG. 2B shows an equivalent circuit of the concrete configuration shown in FIG. 2A.
Figures 5A, 5B, 5C:
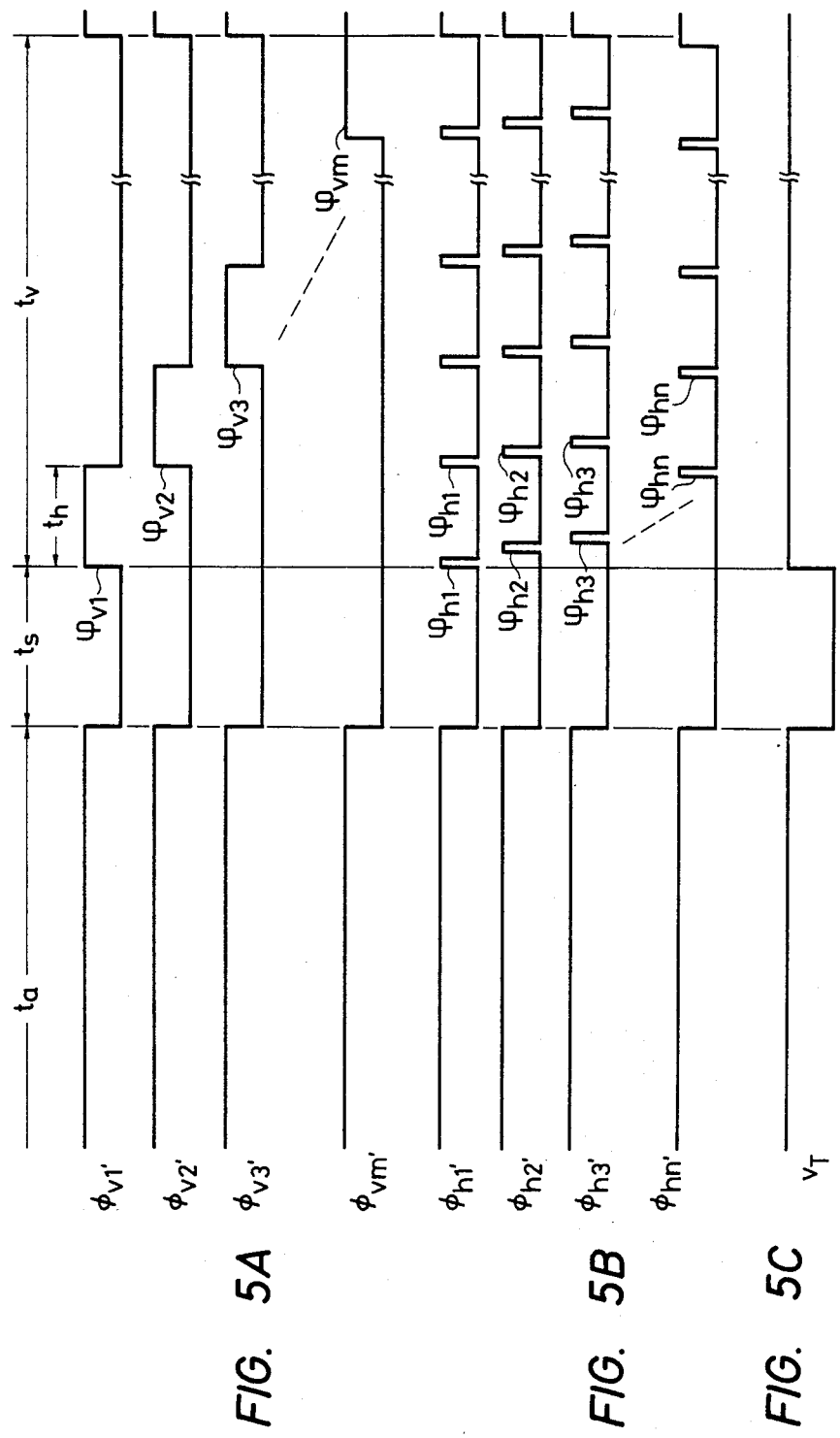
FIGS. 5A, 5B and 5C are waveform diagrams used for the operation of a solid state image pickup apparatus according to the present invention.

A preferred embodiment of solid state image pickup apparatus according to the present invention is obtained by applying the concept of the invention to the solid state image pickup apparatus shown in FIG. 1. In the embodiment thus obtained, the vertical scanning circuit 13 and horizontal scanning circuit 14 are provided with the respective contents different from those of the previously proposed apparatus. The vertical scanning circuit 13 used in the apparatus according to the present invention produces vertical scanning signals $\phi_{v1}'$ to $\phi_{vm}'$ as shown in FIG. 5A at the output terminals $v_1$ to $v_m$, respectively, and supplies these vertical scanning signals $\phi_{v1}'$ to $\phi_{vm}'$ to the gates of the MOS FETs $S_{11}$ to $S_{mn}$, and the horizontal scanning circuit 14 used in the apparatus according to the present invention produces horizontal scanning signals $\phi_{h1}'$ to $\phi_{hn}'$ as shown in FIG. 5B at the output terminals $h_1$ to $h_n$, respectively, and supplies these horizontal scanning signals $\phi_{h1}'$ to $\phi_{hn}'$ to the gates of the MOS FETs $T_1$ to $T_n$. The vertical scanning signals $\phi_{v1}'$ to $\phi_{vm}'$ take a constant high level in the period $t_a$ coming before the period $t_s$ in which the shutter is made open and a constant low level in the period $t_s$. Then, the vertical scanning signals $\phi_{v1}'$ to $\phi_{vm}'$ have the aforementioned pulses $\phi_{v1}$ to $\phi_{vm}$ each taking the constant high level during the period $t_h$ corresponding to one horizontal period, respectively, in a predetermined period, for example the period $t_v$ corresponding to one vertical period and coming after the period $t_s$, and take again the constant high level in the period following to the period $t_v$ in the same manner as taken in the period $t_a$. Similarly, the horizontal scanning signals $\phi_{h1}'$ to $\phi_{hn}'$ take a constant high level in the period $t_a$ and a constant low level in the period $t_s$, then have the aforementioned pulses $\phi_{h1}$ to $\phi_{hn}$ each taking the constant high level during the short period, respectively, in the period $t_v$ and take again the constant high level in the period following to the period $t_v$ in the same manner as taken in the period $t_a$. Each of the MOS FETs $S_{11}$ to $S_{mn}$ is made conductive when the high level portion of one of the vertical scanning signals $\phi_{v1}'$ to $\phi_{vm}'$ is supplied to the gate thereof, and each of the MOS FETs $T_1$ to $T_n$ is made conductive when the high level portion of one of the horizontal scanning signals $\phi_{h1}'$ to $\phi_{hn}'$ is supplied to the gate thereof.

Accordingly, in the period $t_a$ coming before the period $t_s$ in which the shutter is made open, both the vertical scanning circuit 13 and the horizontal scanning circuit 14 operate to produce the outputs taking the respective constant high levels in a stable state wherein, for example, the shift registers contained therein are inoperative and therefore the electric power consumption in the vertical and horizontal scanning circuits 13 and 14 is very small. Further, in the period $t_a$, since all the MOS FETs $S_{11}$ to $S_{mn}$ and the MOS FETs $T_1$ to $T_n$ are made continuously conductive, charge obtained in the form of idling current in the photoelectric converters $D_{11}$ to $D_{mn}$ constituting the image pickup picture units $E_{11}$ to $E_{mn}$, respectively, is drained through the MOS FETs $S_{11}$ to $S_{mn}$, the MOS FETs $T_1$ to $T_n$ and the output resistor 15 to the voltage source 16 without being stored in the image pickup picture units $E_{11}$ to $E_{mn}$. Consequently, no unnecessary charge is stored in the image pickup picture units $E_{11}$ to $E_{mn}$ at an instant just before the period $t_s$.

Then, in the period $t_s$ in which the shutter is made open, all the MOS FETs $S_{11}$ to $S_{mn}$ and the MOS FETs $T_1$ and $T_n$ are made continuously nonconductive and signal charge produced in response to the light entering into the image pickup picture units $E_{11}$ to $E_{mn}$ is stored in the image pickup picture units $E_{11}$ to $E_{mn}$, and in the period $t_v$ corresponding to one vertical period and following to the period $t_s$, the MOS FETs $S_{11}$ to $S_{mn}$ and the MOS FETs $T_1$ to $T_n$ are made conductive selectively, so that signals obtained in response to the signal charge stored in the image pickup picture units $E_{11}$ to $E_{mn}$ are derived to the output terminal 17 and an image pickup signal output representing a still image is obtained in the same manner as the aforementioned previously proposed apparatus. However, in this case, since no unnecessary charge is stored in the image pickup picture units $E_{11}$ to $E_{mn}$ before the signal charge is stored therein, the signals derived from the image pickup picture units $E_{11}$ to $E_{mn}$ do not contain noise components resulted from the unnecessary charge.

After the period $t_v$ in which the image pickup signal output representing the still image has been obtained, both the vertical and horizontal scanning circuits 13 and 14 operate again to produce the outputs taking the respective constant high level in the stable state and therefore the MOS FETs $S_{11}$ and $S_{mn}$ and the MOS FETs $T_1$ and $T_n$ are made conductive so as to be in a standby state for the next image pickup operation. In such a manner as mentioned above, the electric power consumption in the vertical and horizontal scanning circuits 13 and 14 is reduced and the unnecessary charge obtained in the form of idling current in the image pickup picture units $E_{11}$ to $E_{mn}$ is eliminated when the MOS FETs $S_{11}$ to $S_{mn}$ and the MOS FETs $T_1$ to $T_n$ are in the standby state.

Figure 3A:
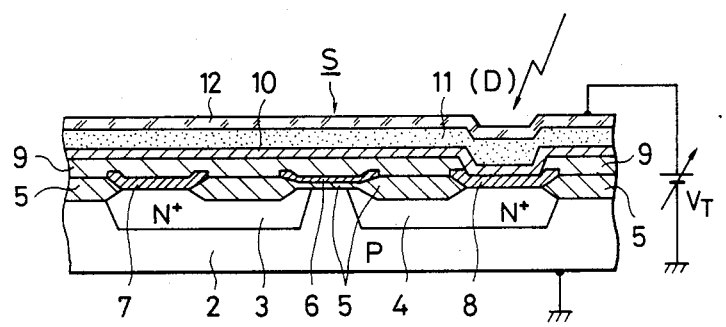
FIG. 3A is a sectional view showing another example of concrete configuration of a portion of the apparatus shown in FIG. 1.
Figure 3B:
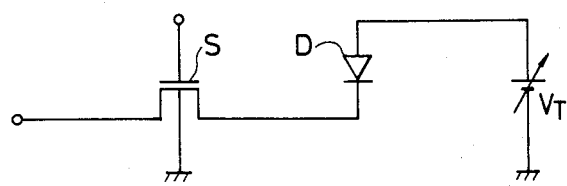
FIG. 3B shows an equivalent circuit of the concrete configuration shown in FIG. 3A.

In the apparatus according to the present invention, an ordinary mechanical shutter which may be disposed in front of the image pickup surface can be used as the shutter mentioned above, and in case of the apparatus in which the solid state image pickup device 1 has the photoelectric converters $D_{11}$ to $D_{mn}$ formed by a photoelectric conversion layer as shown in FIG. 3A, an electric shutter can be formed to be used as the shutter mentioned above by controlling the target voltage $V_t$ supplied to the photoelectric conversion layer to take a low level only in the period $t_s$ and a high level in other periods, as shown in FIG. 5C, so that only the charge produced in the photoelectric converters $D_{11}$ to $D_{mn}$ in the period $t_s$ becomes the signal charge.

APPLICABILITY FOR INDUSTRIAL USE

As described above, the solid state image pickup apparatus according to the present invention can produce an image pickup signal output representing a still image accompanied with enough suppressed noise components and being superior in quality, and therefore is quite suitable for being formed into a high-grade still television camera miniaturized in size and light in weight.

We claim:

1. A solid state image pickup apparatus comprising an image pickup surface composed of a plurality of image pickup picture units each of which contains a switching device and a photoelectric converter arranged in a matrix of horizontal rows and vertical columns, a shutter which is periodically opened and closed to simultaneously supply light to all of said photoelectric converters, a vertical switch control with a plurality of outputs each respectively connected to sequentially turn on the switching elements of common horizontal rows after said shutter has been opened and closed, a plurality of horizontal switch means respectively connected to said columns of switching devices, a horizontal switch control connected to said plurality of horizontal switch means to sequentially switch them on after said shutter has opened and closed to remove the image charges and said vertical and horizontal switch controls supplying signals to render all of said switching devices of said image pickup picture units and said plurality of horizontal switch means conductive during the period after said image charges have been shifted out until said shutter is openend and renders them non-conductive when said shutter is open.

* * * * *